3,318,972
COMPOSITION CONTAINING A HYDROFORMYLATED-HYDROGENATED REACTION PRODUCT OF AN UNSATURATED HYDROCARBON POLYMER AND AN EPOXIDIZED POLYOLEFIN
Joseph Kern Mertzweiller, Baton Rouge, La., and Neville Leverne Cull, Atlantic Highlands, N.J., assignors to Esso Research and Engineering Company, a corporation of Delaware
No Drawing. Filed Apr. 14, 1964, Ser. No. 363,043
17 Claims. (Cl. 260—836)

The present invention relates to a method of crosslinking polymers and to the cured polymers obtained. More particularly, the invention relates to crosslinking certain novel hydroxylated polymers with epoxidized polyolefins.

Certain novel hydroxylated polymers, that is, saturated polymers containing 2–30 primary hydroxyl groups/molecule for polymers of 300 to 5000 molecular weight have been found to be potentially important because of their desirable functionality and their favorable commercial availability in volume at low cost. Such polymers are produced by utilizing a two-stage process in which process conditions in the first stage are set to maximize oxonation and minimize hydrogenation of the unsaturated carbon-carbon linkages of the starting polymer, followed by a second stage operating under maximum hydrogenation conditions.

It has been found that superior air dried and baked coatings can be produced by blending the above-described hydroxylated polymers with certain epoxidized polyolefin coagents, i.e. olefinic polymers containing at least one, and preferably, a plurality of oxirane groups,

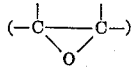

A particularly outstanding feature of this invention is that the hydroxyl functional groups in the hydroxylated polymers are primary rather than secondary. This results in more rapid cures and more complete cures and hence better properties in the cured films. In addition, by having the hydroxyl and epoxy groups on separate polymer molecules more highly crosslinked systems are produced than if both hydroxyl (secondary) and epoxy groups are on the same polymer molecule as in the conventional epoxy resins.

In accordance with the present invention the hydro- that superior resinous materials can be produced if the foregoing blends are accomplished in the presence of free radical generating curatives.

In accordance with the present invention the hydroxylated polymer utilized is produced in a two-stage process which comprises reacting, in a first stage, an unsaturated hydrocarbon compound as hereinlater described with carbon monoxide and hydrogen in the presence of a hydrocarbon soluble cobalt complex, that is, for example, one having the formulae:

(1)         [Co$_2$(CO)$_6$(PR$_3$)$_2$]

(2)         [(C$_n$H$_{2n-1}$)Co(CO)$_y$(PR$_3$)]$_x$ where R is an alkyl radical containing about 1 to 6 carbon atoms, $n$ is an integer of from 3 to 6 and $x$ is 1 or 2 and $y$ is 1 or 2 with the proviso that when $x$ is 1 then $y$ is 2, and when $x$ is 2, then $y$ is 1, to produce a predominantly carbonylated intermediate polymer. In a second stage, said intermediate polymer is reacted with hydrogen and from 10 to 200 p.s.i.g. partial pressure of CO in the presence of a catalyst as set forth as (1) and (2) above.

The hydroxylated polymers to which the present invention is applicable broadly comprise the hydroformylation products of unsaturated hydrocarbon polymers having molecular weights of from about 300 to 5000 and have had about 5% to 100% of said unsaturation replaced with —CH$_2$OH. In terms of oxygen content of these polymers, this represents an oxygen content of from 0.5 to almost 20% by weight, which is present as oxygen containing functional groups, i.e., primary alcohol groups. As a general rule the hydroxyl number of the polymers employed is within the range of from about 25 to about 500 and preferably from about 150 to about 250.

The functionality of the hydroxylated polymers can be determined readily by an analysis for hydroxyl content. The hydroxyl number is a measure of and is proportional to the hydroxyl concentration per unit weight.

The hydroxyl number is defined in terms of milligrams of KOH equivalent per gram of hydroxylated polymer reaction product and is determined by reacting acetic anhydride (in pyridine solution) at refluxing temperature with the hydroxyl groups of the polymer product. The unreacted anhydride and acetic acid formed are titrated with aqueous sodium hydroxide using phenolphthalein as an indicator. The functionality of the polymer can be readily calculated from the hydroxyl number and the average molecular weight by employing the formula:

$$\text{Functionality} = \frac{\text{Molecular weight} \times \text{hydroxyl number}}{1000 \times 56.1}$$

The hydroxylated polymers falling within the purview of the present invention can be produced by the two-stage hydroformylation-hydrogenation of any hydrocarbon polymer having at least one ethylenic carbon-to-carbon bond in said polymer. Thus, polymers having Type I (pendant vinyl) unsaturation, Type II (internal cis or trans) unsaturation, Type III (tertiary) unsaturation, Type IV (tri-substituted) unsaturation or polymers having more than one of such types may be employed to produce the hydroformylated polymers used in the process of this invention. Certain types of unsaturation are found to be preferred over the others, however, and therefore Type I (pendant vinyl) and Type III (tertiary) unsaturation are most preferably present in the hydrocarbon polymer with Type II (internal cis or trans) and Type IV (tri-substituted) unsaturation following in that order.

The starting hydrocarbon polymers suitable for hydroformylation-hydrogenation are further characterized by their molecular weight, viz. about 300 to about 5000. The polymers amenable to the hydroformylation-hydrogenation reactions may be oily, elastomeric, plastic, and the like type polymers prepared by any suitable polymerization process. Thus, included are the Buton resins, elastomeric polybutadiene, styrenebutadiene rubber, natural rubber, and ethlylene-propylene-diolefin tripolymers. The basic requirement is that the polymers contain one or more of the types of unsaturation set forth above and in sufficient quantity that they undergo reaction with the type of catalysts described herein.

It has been found that diolefin polymers or copolymers of a diolefin with a mono-olefin are especially amenable to the present invention. Therefore, polybutadiene, polypentadiene, polycyclopentadiene, polyisoprene, and mixtures or copolymers of one or more of these diolefins and the like are examples of preferred starting polymers. Examples of the preferred starting copolymers of diolefins with mono-olefins contemplated by the present invention are butadienestyrene copolymers, pentadiene-styrene copolymers, isoprene-styrene copolymers, and also copolymers o fthe diolefins with aliphatic mono-olefins, methyl styrene, and the like.

Especially amenable as starting polymers for the hydroformylation-hydrogenation reaction are commercial polybutadiene or copolymers of butadiene and styrene of molecular weights in the range of about 300 to about 1000, for example, Buton–100 of molecular weight 2500–1000 and Buton–150 of molecular weight 1500–3000.

The hydrocarbon polymers employed as starting materials in the present invention may generally be prepared by any method known in the art, for example, by the use of a sodium or lithium alkyl or free radical catalyst.

The polymers are generally hydroformylated in an inert hydrocarbon medium which may be either paraffinic or aromatic-type solvents, the latter being preferred.

Broadly, the hydrocarbon soluble complexes used as catalysts in both stages to produce the polymers used in the process of the present invention are oxo-type catalysts and can be represented by the following formulae:

(3) $\quad\quad\quad [M_2(CO)_6(BR_3)_2]$ and (4) $\quad\quad\quad [(R')M(CO)_y(BR_3)]_x$ where in both Formula 3 and Formula 4 M is a transition metal selected from the group consisting of iron, cobalt, and rhodium, and preferably is cobalt; B is a Group VA atom selected from the group consisting of phosphorus and arsenic, and preferably is phosphorus; R is an alkyl radical containing from 1 to about 20, and preferably 1 to 6 carbon atoms and in Formula 4 R' represents a pi-bonded conjugated diolefin or allylic structure containing 3 to 6 carbon atoms; $x$ is 1 or 2 and $y$ is 1 or 2 with the proviso that when $x$ is 1 then $y$ is 2, and when x is 2 then $y$ is 1.

The preferred forms of the complexes employed in both stages to produce the polymers employed in the present invention, however, are represented by Formulae 1 and 2 above, which are set forth again as follows:

(1) $\quad\quad\quad [Co_2(CO)_6(PR_3)_2]$ and (2) $\quad\quad\quad [C_nH_{2n-1}Co(CO)_y(PR_3)]_x$ where in both Formula 1 and Formula 2, R is an alkyl radical containing from 1 to 6 carbon atoms, and in Formula 2, $n$ is an integer from 3 to 6 and $x$ and $y$ are as defined above.

Preparation of the complexes employed to produce the polymers of the present invention is described more fully in copending applications, Ser. No. 256,258 and Ser. No. 256,260 of Mertzweiller and Tenney, both filed Feb. 5, 1963. It should be understood, however, that the scope of the instant application should be in no way restricted in view of the above disclosures.

In the preparation of the hydroxylated polymers, the first stage hydroformylation reaction step is effected by intimately contacting an olefinic hydrocarbon polymer with carbon monoxide and hydrogen in the presence of the phosphine catalyst complex hereinbefore described at hydroformylation temperature and pressure. In this first stage, conditions are set to maximize carbonylation and minimize hydrogenation of unsaturated carbon-carbon linkages of the polymer.

The first-stage reaction may be performed at pressures of from 300 to 2000 p.s.i.g., and preferably at pressures of from 500 to 1200 p.s.i.g.

The first-stage reaction temperatures employed are in the range of from 275° F. to 425° F., and are preferably in the range of from 300° F. to 400° F.

The reaction time in this first stage is from 30 minutes to 5 hours and preferably is from 1 to 3 hours.

The molar ratio of hydrogen to carbon monoxide is not especially critical and may be varied to some extent. Suitably, the ratio employed will be about 1:1. It has been found, however, that by increasing the $H_2/CO$ ratio to about 3:1, the rate of reaction, as well as the yield of carbonylated product may be increased. While ratios higher than the foregoing, for example 10:1 or higher, may be employed there is no advantage in using said higher ratios.

The use of low catalyst concentration, that is, 0.05 to 0.5 weight percent as metal based on the weight of the polymer, is preferred in the process of the present invention. The preferable range includes catalyst concentrations as low as 0.1 to 0.40 weight percent as metal based on the weight of the polymer.

The second stage hydrogenation reaction may be performed at pressures from 100 to 3000 p.s.i.g., and preferably at pressures of from 100 to 1500 p.s.i.g.

The second stage reaction temperatures employed are in the range of from 325° F. to 450° F., and are preferably in the range of from 375° F. to 425° F.

The reaction time in the second stage is from 0.5 to 6 hours and preferably is from 1 to 2 hours.

Hydrogenation of the intermediate aldehydic product of stage 1 is preferably effected with the same catalyst used in the first stage although additional catalyst may be added, if desired.

In the second stage an extremely rapid hydrogenation is achieved which will hydrogenate not only the carbonyl group, but if desired, also the internal unsaturation in the polymer chain. This is believed to proceed with a homogeneous catalyst system which activates hydrogen, the primary component of which being the complexes as hereinbefore described which are now found to be unusually stable and active hydrogenation catalysts. It is, therefore, somewhat critical to avoid conversion of the complexes to metallic cobalt, even in colloidal forms. This object is accomplished by retaining sufficient CO partial pressure, for example about 10 to 200 p.s.i.g., to stabilize the system. While relatively small amounts of decomposition may be encountered, approximately all of the catalyst complex can be removed later by any suitable means known to the art, for example, acid extraction, thermal decomposition, electromagnetic precipitation, and the like. Preparation of the polymers employed is set forth more fully in U.S. Ser. No. 307,359 of Cull, Mertzweiller and Tenney, filed Sept. 9, 1963.

Among the epoxidized polyolefins suitable for use to crosslink copolymers in accordance with the present invention are those polymers containing one or more epoxide or oxirane groups

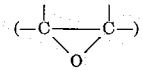

While no theoretical lower or upper limit exists for the chain length of the epoxidized polyolefin, there are, however, certain practical considerations which impose a limit on the degree of epoxidation of the polyolefin curative. For example, the degree of epoxidation of the polyolefin must be considered in connection with the effectiveness of the curative and in the properties desired in the resulting crosslinked product. A highly epoxidized olefin polymer curing agent will produce a crosslinked product of somewhat different properties than would be obtained by the use of a curative of a lower degree of epoxidation. Thus, the choice of the epoxidized polymer is obviously important. Preferred polymers are those of butadiene, the copolymers of butadiene with mono-olefins, such as butene, styrene, substituted styrene, nitriles, such as acrylonitrile, methacrylonitrile, esters of acrylic and methacrylic acid, and the like, especially where the mono-olefin forms a minor part of the polymer. Other diolefins, such as isoprene, piperylene, etc. may be used in lieu of butadiene. In general, the polymers of low to moderate molecular weight having a substantial proportion of the unsaturated carbon-to-carbon bonds oxidized to epoxide groups are useful. Among the preferred low molecular weight diepoxides are butadiene dioxide:

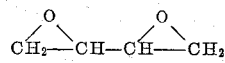

and diglycidyl ether:

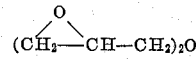

Especially preferred for use as curing coagents in accordance with the present invention are epoxidized butadiene copolymers. The butadiene copolymers comprise the conjugated dienes, for example, butadiene and isoprene, as well as alkyl substitution products thereof, copolymerized with a substituted ethylene monomer containing the $$CH_2=CH-$$

group, for example styrene and acrylonitrile among others. These polyepoxides are well known in the art. Both resinous and nonresinous polyepoxides may be used. In the examples, reference will be had to Oxiron 2000 resins, polyfunctional resinous products manufactured by Food Machinery and Chemical Corporation, known to contain the structural formula:

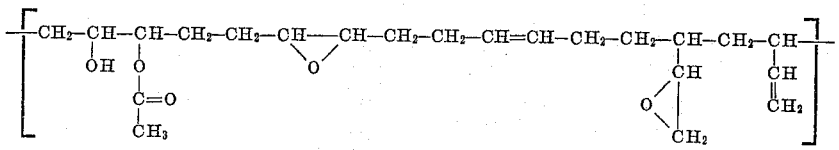

The properties of these resinous epoxies, which may be used in carrying out the present invention, are given in the following table:

| | | | |
|---|---|---|---|
| Oxiron | 2,000 | 2,001 | 2,002 |
| Viscosity, Poise at 25° C | 1,800 | 160 | 15 |
| Active Ingredients, percent | 100 | 100 | 100 |
| Specific Gravity | 1.010 | 1.014 | 0.985 |
| Epoxy, percent | 9.0 | 11.0 | 6.9 |
| Epoxy Equivalent [1] | 177 | 145 | 232 |
| Hydroxyl, percent | 2.5 | 2.0 | 1.9 |
| Iodine Number | 185 | 154 | -------- |

[1] Number of grams of resin containing 1 gram mole of epoxide.

The amount of epoxided polyolefin reacted with the hydroxylated polymer will depend on the application, but will be based on the equivalent amount required for reaction with each hydroxyl group of the polymer. The amount employed should be sufficient to have present in the total mass about one equivalent of epoxide or oxirane group per equivalent of the hydroxylated polymer. In other words, the amount of epoxidized polyolefin compound employed must be such that there is the theoretical amount required to form a crosslinkage by reaction of each hydroxyl and epoxide group. In accordance therewith, the amount of epoxidized polyolefin employed may be in the broad range of from 0.5 to 2 equivalents per hydroxyl group, but will preferably be about 1 equivalent per hydroxyl group of the polymer. While the amount of epoxidized polyolefin employed will vary with the number of active hydrogen atoms, i.e., hydroxyl groups, contained in the polymer, generally between about 5 and 200 percent by weight of epoxidized polyolefin based on weight of polymer will produce a plastic having suitable properties, with about 10 to 75 percent by weight of epoxidized polyolefin based on weight of polymer being the amount most preferably employed.

The process of the invention broadly comprises mixing the epoxidized polyolefin with the hydroxylated polymer, said hydroxyl groups being reactive with the epoxide groups. There is no critical order of addition, reaction temperature or reaction time involved in this process. In order to minimize side reactions, however, it is desirable to maintain the temperature of the reactants below about 200° F.

In one preferred embodiment, coating compositions can be prepared by reaction of an epoxidized polyolefin with the hydroxylated polymers as set forth above, and, if desired, in an inert solvent, therefore said reaction mixture leading to the production of said coating composition. Any suitable inert organic solvent may be used such as, for example, xylene, ethyl acetate, toluene, ethene glycol monoethylether acetate, and the like. The resulting coating composition can be applied in any suitable fashion as by dipping, brushing, roller coating, spraying, and the like. Any suitable substrate may be coated with the coating compositions of this embodiment of the invention, such as, for example, wood, paper, porous plastics, such as, for example, sponge rubber, cellular plastics, and the like as well as metals such as steel, aluminum, copper, and the like. The coating compositions need not contain a solvent for all applications. If desired, the coating compositions of the invention may contain any suitable pigment, such as, for example, iron oxide, carbon black, titanium dioxide, zinc oxide, chrome green, lithol red, and the like. In general, flexible chemically resistant coatings are obtained in accordance with the process of the invention.

In another preferred embodiment, curing adjuvents, such as amino silanes, amino acids, polyamines, dibasic acids and anhydrides, polyphenols, Lewis-type catalysts, polymercaptans and polysulfides can be employed in conjunction with the epoxidized polyolefin crosslinking agent. In general, the amount of the aforementioned substances used in combination with the novel curing coagents will range from small amounts, i.e. 0.05 up to 20 parts by weight per 100 parts by weight of hydroxylated polymer (p.h.p.) and preferably about 0.5 to 5 p.h.p.

Also useful as adjuvants are the organo functional silanes, that is, organosilanes containing functional groups, for example, an amino ($—NH_2$) or carbethoxy ($—COOC_2H_5$) radical attached to the terminal carbon of the silicon-carbon side chain. Amino modified silanes are preferred in the practice of the present invention with gamma aminopropyltriethoxysilane and delta aminobutylmethyldiethoxysilane and gamma aminobutyltriethoxysilane being especially preferred.

Adjuvants also suitable are amines and polyamines, in particular, any diamine, triamine, and higher polyamine having one or more of the following types of amino groups: (a) unsubstituted amino groups, (b) mono-substituted amino groups, (c) di-substituted amino groups, and (d) heterocyclic amines such as pyridine. The substituents on the mono- and di-substituted amino groups are one or more of alkyl, aryl and heterocyclic groups. An added advantage in using these polyamines is that they not only effectively produce the cured copolymers of the invention, but they also act as antioxidants and stabilizers.

Suitable dibasic acids for use as adjuvants in the present invention are saturated or unsaturated dicarboxylic acids or anhydrides. Examples of acids are: adipic, fumaric, maleic, malic, oxalic, sebacic, tartaric, and the like. Examples of anhydrides which may be used are: maleic, succinic, phthalic, tetrahydrophthalic, and the like.

Polyphenols suitable for use include catechol resorcinol, 2,5-di(t-amyl)hydroquinone, 4,4'-thiobis-(6-t-butyl-m-cresol).

Lewis-type catalysts suitable for use include aluminum chloride, stannous chloride, ferric chloride. Polymercaptans suitable for use include glycol dimercapto-acetate, 1,5-pentanedithiol.

Polysulfides suitable for use include butyl disulfide, phenyl disulfide, t-butyl trisulfide.

In still another embodiment of this invention, highly desirable resinified products can be produced by curing the above formulations in the presence of a free radical generating compound, i.e., hydrogen peroxide. Thus, in accordance with this embodiment, resins may be prepared from a mixture of (1) hydroxylated polymer with (2) an epoxidized polyolefin, and (3) a curing adjuvant by curing with hydrogen peroxide employed as a free-radical generating compound. Non-limiting examples of other suitable free radical-generating compounds include the common organic hydroperoxides and oragnic peroxides, e.g., dicumylperoxide, ditertiary butylperoxide, benzoylperoxide, etc. Broadly, said free radical generating compounds are employed in amounts of from 0.1 to 5 weight percent based on total mixture and preferably 0.2 to 1 weight percent.

Blends of the polymer solution of Example I and a commercial epoxidized diolefin polymer (Oxiron 2001, Food Machinery and Chemical Corp.) were prepared to give 20% and 30% concentration of the Oxiron 2001 in the hydroformylation polymer. The total polymer concentration was adjusted to 35% by xylene addition. Steel panels were pour coated with these blends both with and without catalysts as indicated in the evaluation shown in the following tabulation.

20% OXIRON 2001 ON HYDROFORMYLATED BUTON-150

| Run No. | Temp., °F. | Time, Min. | Catalyst (Conc.) | Pencil Hardness | Eye Hole Tendency |
|---|---|---|---|---|---|
| 1 | 350 | 10 | None | 2H-5H | Very Slight. |
| 2 | 320-340 | 15 | None | 4H-6H | Do. |
| 3 | 350 | 20 | None | 3H-8H | Do. |
| 4 | 350 | 10 | 1% Benzyl Dimethyl Amine. | 2H-6H | Do. |
| 5 | 365 | 5 | do | H-2H | Do. |
| 6 | 390 | 10 | do | 5H-8H | Do. |
| 7 | 390 | 15 | do | 5H-8H | Do. |
| 8 | 320-340 | 15 | 1% Triethyl Amine | 3H-6H | Do. |
| 9 | 350-375 | 10 | do | 3H-6H | Do. |

30% OXIRON 2001 ON HYDROFORMYLATED BUTON-150

| Run No. | Temp., °F. | Time, Min. | Catalyst (Conc.) | Pencil Hardness | Eye Hole Tendency |
|---|---|---|---|---|---|
| 10 | 350 | 10 | None | 2H-6H | Severe. |

The examples which follow illustrate, but do not limit this invention.

*Example I*

This example illustrates the preparation of hydroxylated polymer utilized in the present invention.

A 300 cc. stirred autoclave was charged with 130 gms. of a 40% (xylene) solution of commercial polybutadiene (Buton-150) of about 1800 molecular weight. The catalyst consisted of 1.2 gms. of a solution prepared by heating a slurry of 20 gms. of the insoluble catalyst precursor $[Co(CO)_3(PBu_3)_2][Co(CO)_4]$ in 100 gms. n-hexane at temperatures of 380-385° F. and pressures of 430-480 p.s.i.g. with a 1/1 $H_2/CO$ synthesis gas for 35 minutes. The catalyst was mixed with the polymer solution prior to charging the autoclave.

The hydroformylation was carried out with a 1/1 ratio of $H_2/CO$ synthesis gas at pressures of 1100-1300 p.s.i.g. and temperatures of 380-385° F. for a total period of 125 minutes. The mixture was then treated with hydrogen at pressures of 1500-1600 p.s.i.g. for 60 minutes at temperatures of 380-385° F. after which time gas absorption ceased. The light yellow polymer solution contained 5.65 weight percent oxygen (on polymer) and the infrared spectrum showed strong bands at 2.9 and 9.4 microns (primary OH) and slight absorption at 5.75 microns (carbonyl).

*Example II*

This example illustrates the preparation of coatings prepared from hydroxylated polymers and the evaluation of same.

The variations in hardness are due to slight variations in film thickness. It is noted that suitable hard films are obtained either with or without catalyst at relatively short baking schedules. This is attributed to the high activity of the primary hydroxyl groups.

*Example III*

This example serves to illustrate the solution of a problem inherent with the polymers of this invention, that is, preparation of solid resins from hydroxylated polymers is complicated by the fact that the solvent-free product is extremely viscous. Thus, for resin applications the use of a reactive diluent to reduce initial viscosity is found to be necessary.

One hundred grams of hydroxylated polymer produced in a manner similar to that of Example I (NVM 38.1, weight percent $O_2$=5.5, solvent benzene) were mixed with 60 grams of Oxiron 2002 (an epoxidized polybutadiene from Food Machinery and Chemical Corporation). This mixture was stripped under high vacuum at room temperature to remove the benzene. Three formulations were then tried, all utilizing a peroxide cure.

| Formulation No. | 1 | 2 | 3 |
|---|---|---|---|
| Percent Oxiron-Polymer Blend | 99 | 76 | 71. |
| Percent Maleic Anhydride | 0 | 22 | 28. |
| Percent Propylene Glycol | 0 | 1.0 | 0. |
| Peroxide | DTBP [1] | DiCuP [2] | DTBP.[1] |
| Weight Percent Peroxide | 1.0 | 0.5 | 1.0. |
| Cure | 16 Hrs. at 195° F.; 24 Hrs. at 260° F. | 3 Hrs. at 190° F.; 16 Hrs. at 230° F. | 16 Hrs. at 230° F. |

[1] DTBP=Ditertiary Butyl Peroxide.
[2] DiCuP=Dicumene Peroxide.

Formulation Number 1 did not cure under the above conditions and remained plastic. The second formulation cured and gave a tough, flexible resin. The third formulation gave a very hard tough resin which could be machined.

What is claimed is:

1. A plastic composition prepared by the reaction of an epoxidized polyolefin containing at least one oxirane ring:

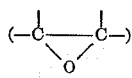

with a hydroxylated polymer, said polymer comprising the two-stage hydroformylation-hydrogenation reaction product of an unsaturated hydrocarbon polymer having a molecular weight of from about 300 to about 5000 wherein about 5 to 100% of said polymer's unsaturation has been replaced with —CH₂OH groups and wherein the epoxidized polyolefin is employed, in amounts of from 0.5 to 2 equivalents per hydroxyl group of said hydroxylated polymer.

2. A plastic composition prepared by the reaction of an epoxidized polyolefin containing at least one oxirane ring:

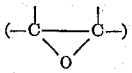

with a hydroxylated polymer, said polymer comprising the two-stage hydroformylation-hydrogenation reaction product of an unsaturated hydrocarbon compound having a molecular weight of from about 300 to about 5000 with carbon monoxide and hydrogen wherein from about 5 to 100% of said unsaturation is replaced with —CH₂OH groups and wherein the epoxidized polyolefin is employed, in amounts of from 0.5 to 2 equivalents per hydroxyl group of said hydroxylated polymer.

3. The composition of claim 2 in which the epoxidized polyolefin has the general formula:

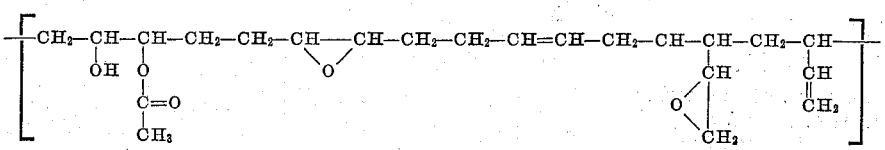

4. The composition of claim 2 in which the unsaturated hydrocarbon polymer is selected from the group consisting of diolefin polymers and copolymers of a diolefin with a mono-olefin.

5. The composition of claim 4 in which the polymer is a butadiene-styrene copolymer having a molecular weight of from about 300 to about 4000.

6. The composition of claim 4 in which the polymer is a butadiene polymer having a molecular weight of from about 300 to about 4000.

7. A plastic composition prepared by the reaction of substantially equivalent amounts of an epoxidized polyolefin having the general formula:

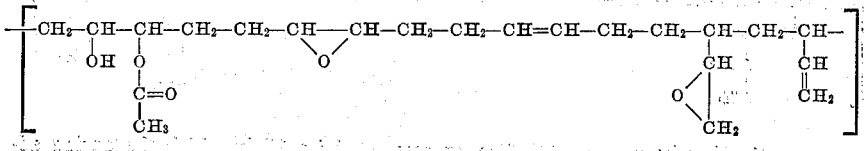

with a hydroxylated polymer, said polymer comprising the two-stage hydroformylation-hydrogenation reaction product of an unsaturated hydrocarbon polymer with carbon monoxide and hydrogen, wherein the molecular weight of said product is from 1500 to 2000, from 5 to 100% of said unsaturation has been replaced with —CH₂OH, and —CHO, and wherein the oxygen content introduced into said polymer is from about 0.5 to 20% by weight and wherein the epoxidized polyolefin is employed, in amounts of from 0.5 to 2 equivalents per hydroxyl group of said hydroxylated polymer.

8. A plastic composition prepared by the reaction of a crosslinking compound comprising an epoxidized polyolefin containing at least one oxirane group:

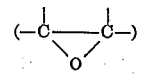

and a curing adjuvant with a hydroxylated polymer, said polymer comprising the two-stage hydroformylation-hydrogenation reaction product of an unsaturated hydrocarbon polymer having a molecular weight of from about 300 to about 5000 wherein about 5 to 100% of said polymer's unsaturation has been replaced with —CH₂OH groups, said reaction being carried out in the presence of a peroxide catalyst and wherein the epoxidized polyolefin is employed, in amounts of from 0.5 to 2 equivalents per hydroxyl group of said hydroxylated polymer.

9. A method of making plastic compositions which comprises admixing a crosslinking compound comprising an epoxidized polyolefin containing at least one oxirane group:

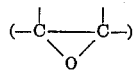

with a hydroxylated polymer prepared from an unsaturated hydrocarbon compound having a molecular weight of from about 300 to about 5000 reacted in a two-stage hydroformylation-hydrogenation reaction with carbon monoxide and hydrogen in the presence of a hydrocarbon-soluble complex selected from the class consisting of the following general formulae:

(I) [M₂(CO)₆(BR₃)₂]

and (II) [(R')M(CO)$_y$(BR₃)]$_x$ where in Formulae I and II, M is a transition metal selected from the group consisting of iron, cobalt and rhodium, B is a group-VA atom selected from the group consisting of phosphorus and arsenic, R is an alkyl radical containing from 1 to about 20 carbon atoms, in Formula II, R' is a pi-bonded conjugated diolefin containing from 3 to 6 carbon atoms, $x$ is an integer from 1 to 2, $y$ is an integer from 1 to 2 with the proviso that when $x$ is 1, then $y$ is 2, and when $x$ is 2, then $y$ is 1 and wherein the epoxidized polyolefin is employed, in amounts of from 0.5 to 2 equivalents per hydroxyl group of said hydroxylated polymer.

10. The method of claim 9 in which the epoxidized polyolefin has the general formula:

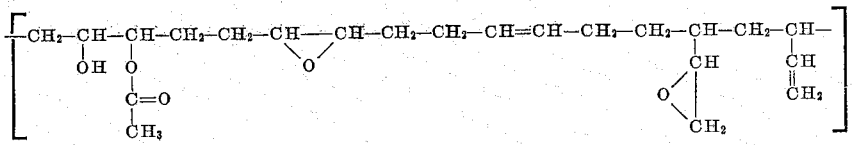

11. A method of making plastic compositions which comprises admixing substantially equivalent amounts of a crosslinking compound comprising an epoxidized polyolefin having the general formula:

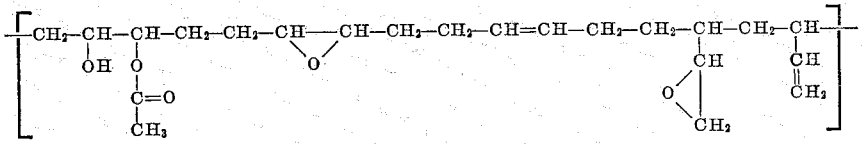

with a hydroxylated polymer comprising the two-stage hydroformylation-hydrogenation reaction product of a hydrocarbon polymer containing olefinic unsaturation with carbon monoxide and hydrogen reacted in the presence of a catalytic amount of a hydrocarbon soluble complex having the formulae:

(III) $[Co_2(CO)_6(PR_3)_2]$ (IV) $[(C_nH_{2n-1})Co(CO)_y(PR_3)]_x$ where R is an alkyl radical containing from 1 to 6 carbon atoms in Formula IV, $n$ is an integer of from 3 to 6, $x$ is an integer of from 1 to 2, and $y$ is an integer of from 1 to 2, with the proviso that when $x$ is 1, then $y$ is 2, and when $x$ is 2, then $y$ is 1 and wherein the epoxidized polyolefin is employed, in amounts of from 0.5 to 2 equivalents per hydroxyl group of said hydroxylated polymer.

12. The process of claim 11 in which the polymer is a butadiene-styrene copolymer having a molecular weight of from about 300 to about 4000.

13. The process of claim 11 in which the polymer is a butadiene polymer having a molecular weight of from about 300 to about 4000.

14. A process for preparing an improved coating composition which comprises mixing 100 parts by weight of a hydroxylated reaction product of an unsaturated hydrocarbon polymer with carbon monoxide and hydrogen, wherein the molecular weight of said product is from 500 to 5000, from 5 to 100% of said unsaturation has been replaced with groups consisting of —CH₂OH, and wherein the oxygen content introduced into said polymer is from about 0.5 to 20% by weight with from 5 to 200 parts by weight of a crosslinking agent comprising an epoxidized polyolefin having the general formula:

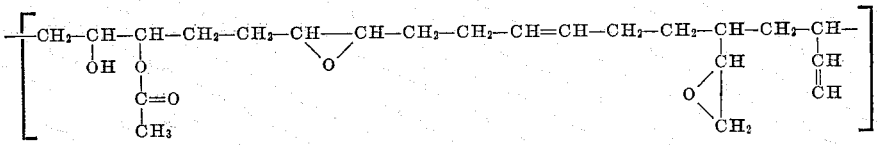

and with an inert organic solvent and wherein the epoxidized polyolefin is employed, in amounts of from 0.5 to 2 equivalents per hydroxyl group of said hydroxylated polymer.

15. A process for preparing an improved resinous composition which comprises mixing 100 parts by weight of a hydroxylated reaction product of an unsaturated hydrocarbon polymer with carbon monoxide and hydrogen, wherein the molecular weight of said product is from 500 to 5000 and 5 to 100% of said unsaturation has been replaced with groups consisting of —CH₂OH, wherein the oxygen content introduced into said polymer is from about 0.5 to 20% by weight, with about 10 to 75 parts by weight of a crosslinking agent comprising an epoxidized polyolefin containing at least one oxirane ring:

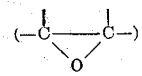

and from 0.05 to 20 parts by weight of a curing adjuvant in the presence of catalytic amounts of a free radical generating compound and wherein the epoxidized polyolefin is employed, in amounts of from 0.5 to 2 equivalents per hydroxyl group of said hydroxylated polymer.

16. The process of claim 15 in which the epoxidized polyolefin has the general formula:

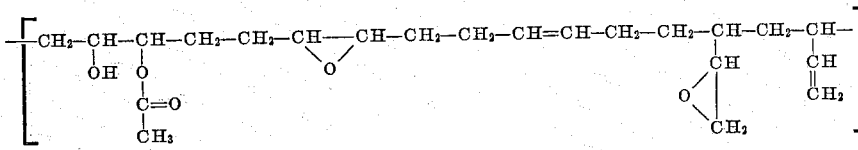

17. The process of claim 15 in which the curing adjuvant is a dibasic acid anhydride.

References Cited by the Examiner

UNITED STATES PATENTS 2,751,322  6/1956  Sloagh et al. _____ 260—85.1
3,231,621  1/1966  Sloagh _____ 260—85.1

MURRAY TILLMAN, *Primary Examiner.*

PAUL LIEBERMAN, *Assistant Examiner.*